United States Patent Office 3,449,483
Patented June 10, 1969

3,449,483
PROCESS FOR THE AGGLOMERIZATION OF SOLIDS FROM A SUSPENSION THEREOF IN WATER
Bernardus Bastiaan Quist, Amsterdam, Netherlands, assignor to Shell Oil Company, New York, N.Y., a corporation of Delaware
No Drawing. Filed Feb. 16, 1967, Ser. No. 616,460
Claims priority, application Netherlands, Mar. 1, 1966, 6602615
Int. Cl. C09c 1/58
U.S. Cl. 264—117
8 Claims

ABSTRACT OF THE DISCLOSURE

Aqueous suspensions of fine solids are agglomerated into hard pellets by imparting a turbulent motion to the suspension in the presence of a bituminous material having a penetration index no higher than zero and a ring and ball softening point no higher than the agglomeration temperature.

---

In the mining industry, a large quantity of fine solid material, generally referred to as "fines," is produced. In many instances, the fines are present as a suspension in water. The recovery of these fines, and particularly recovery in a form for convenient storage and handling is desired. For example, in coal mining, and also in industries where coal is processed, large quantities of coal fines are liberated. In washing the coal, an aqueous suspension of coal fines is obtained. By means of the present process, pellets of a very high mechanical stability and of a diameter of, for instance 5 mm. can be made from these coal fines. These pellets can be stored in large heaps or in bags without breaking or sticking together. Thus, coal fines, for example, which are in themselves of little value, are recovered in a form convenient for further processing, such as in liquifaction of coal, or for fuel.

In accordance with the process of the invention, a turbulent motion is imparted to a suspension of solids in water in the presence of one or more auxiliary materials to promote agglomeration. In the present process the auxiliary material comprises a bituminous material whose penetration index is no higher than zero and whose softening point (ring and ball) is no higher than the temperature employed during the agglomeration.

The auxiliary material expels the water from the surface of the particles concerned, whereupon these particles, when contacting one another, will stick together. The agglomerates thus formed may be more or less spherically shaped. Size and shape ultimately depend on the nature of the turbulent motion, on the nature of the solids concerned, on the auxiliary material, on the concentrations, on the temperature and on the duration of the agglomeration process.

Bituminous materials are taken to include both products derived from petroleum and products derived from coal tar.

The theoretical limits of the penetration index or bituminous materials are —10 and +20, the penetration index of commercially available materials ranges between —2.5 and +8. The influence of temperature on certain rheological properties increases with decreasing penetration index. This is the case with, for instance, the viscosity. A bituminous material with a low penetration index may at 20° C. be a hard substance and at 80° C. be a liquid of fairly low viscosity. The bituminous materials occurring in practice have a softening point (ring and ball) between 35 and 125° C. By using the process according to the invention it is ensured that during the agglomeration the bituminous substance has a sufficiently low viscosity to be capable of expelling the water on the surface of the solid or the solids and to cause particles, when contacting one another, to stick together. The agglomerates thus obtained are hard and strong at comparatively low temperatures, because the bituminous substance has become hard. They can then easily be handled, stored or transported with no risk of sticking together.

Thus, suspensions of carbonaceous solids in water can be treated by the process according to the invention to obtain pellets with the favorable mechanical properties.

It has further been found that the water that remains after the separation of the solids by the process according to the invention no longer contains any binder. This is of great importance in view of the high requirements that are made upon the purity of effluent or of industrial wastes.

In those cases where an aqueous suspension of coal fines also contains sand or stony particles, the resulting agglomerates obtained by the present process are found to contain far less sand or stony particles. Obviously, the bituminous material preferentially binds the coal particles. This is a great advantage, because, as a result, only little ash is formed when the agglomerates are used as fuel. Also, by strong heating, coke for metallurgical purposes can be prepared from such agglomerates.

A special advantage is obtained when the bituminous material has a penetration index of —2 or below. The said advantages of low viscosity at the temperature of the agglomeration and of mechanical strength of the agglomerates obtained are then palpably evident. Moreover, bituminous materials with a penetration index of —2 or below are not suitable for use in the field of road construction or civil engineering. Nor are they suitable for use in industry as anti-corrosion or insulating coatings. Therefore, bituminous materials of this kind are inexpensive, which renders the process of the invention still more attractive economically. A particularly suitable bitumen is that which is prepared from a thermally cracked cycle oil from a catalytic-cracking process.

It is desirable for the temperature during the agglomeration to be at least 40° C. Consequently, a bituminous material having a comparatively low softening point must then be used. As the agglomerates will be stored and/or transported at a temperature below 40° C., the agglomerates will nevertheless be still sufficiently stable. Preferably the agglomeration temperature will be no higher than 90° C. as this avoids the use of pressure. If desired, somewhat higher temperatures may be used, but under suitably elevated pressure.

It has been found desirable for the quantity of bituminous material to be at least equal to 10% based on the weight of the solid to be separated. With 10% it is still possible to obtain agglomerates of reasonable strength. In general, no higher than 10%, and preferably no higher than 20% bituminous material is used for agglomeration.

The present process is advantageous in that it uses very cheap base materials. Asphaltenes are conventionally removed from certain fuel oils for the purpose of improving the quality of those fuel oils. The asphaltenes are normally a waste product. For use in the agglomeration process, the asphaltenes may be supplied in the form of a suspension thereof in water. It is also possible to supply the asphaltenes in the form of a suspension thereof in a hydrocarbon oil or in a part of that oil. It is likewise possible for the asphaltenes to be supplied together with the solid, or solids, to be agglomerated.

Bituminous materials can be prepared from a hydrocarbon oil, such as a heavy distillate or a residual fuel oil, by addition of asphaltenes. By mixing and heating, the asphaltenes are taken up in the hydrocarbon oil with formation of a colloidal system. Depending on the nature and relative quantity of the substances concerned, bituminous products differing in rheological properties can be obtained. The penetration index of the bituminous product obtained increases with increasing content of asphaltenes.

The taking up of asphaltenes in a hydrocarbon oil is usually a slow process that proceeds more quickly as temperature is increased. However, an attractive manner of carrying out the process of the invention is to form the bituminous material from asphaltenes and a hydrocarbon oil during the agglomeration. During the agglomeration, conditions occur that are suitable for the taking up of asphaltenes in the oil, as a result of which a product with bituminous properties is formed. In contacting apparatuses commonly used in practice, residence time of the substances to be agglomerated in the turbulent zone is a few minutes and the temperature is, for instance, at least 40° C. Under these conditions, a quantity of asphaltenes sufficient to provide the desired binder is taken up by the oil. It is an advantage that in the first stages of the process, the oil has not yet taken up any asphaltenes or has only taken up a very small quantity thereof, owing to which the viscosity of oil is still relatively low, which is conducive to expelling the water from the surface of the particles to be agglomerated. It is desirable for the quantity of asphaltenes added to be at least 5% based on the weight of the hydrocarbon oil.

A further advantage is attained when the agglomerates obtained with the bituminous material formed during the agglomeration from a hydrocarbon oil and asphaltenes are subjected to a thermal after-treatment. Owing to this thermal after-treatment, asphaltenes that have not yet been taken up and that are present in the oil in the suspended state will be taken up in the colloidal system, which results in a further hardening of the binder. Depending on the available quantity of asphaltenes, a bituminous material with a high penetration index may be formed, which is suitable in connection with the mechanical stability of the agglomerates. This further hardening thus occurs outside the agglomeration zone. The thermal after-treatment can be effected at a temperature between 80° C. and 300° C. for at least 2 minutes. In general, no more than 60 minutes, and usually no more than 10 minutes are used for the thermal treatment.

It has been found that the process according to the invention gives particularly good results when a contacting apparatus equipped with a rotating cylinder is employed. Such an apparatus may, in addition, be provided with a preliminary turbulent zone where a comparatively strong turbulent motion is maintained. In the preliminary turbulent zone, the suspension may, if necessary, be rendered so fined divided that it is easy for agglomeration nuclei to form, which nuclei can grow into agglomerates in the comparatively quieter agglomeration zone employing the rotating cylinder.

The invention is further illustrated in the following examples.

EXAMPLE I

A beaker of 6 cm. diameter was provided with a cylinder of 3 cm. diameter which was mounted in a coaxial position relative to the beaker and was rotated at a speed of 1700 revolutions per minute. A bituminous material with a penetration index of −2 and a softening point (ring and ball) of 55° C. and a 25% aqueous suspension of coal fines were brought together in the ratio of 0.15 kg. bituminous material to 1 kg. coal fines. The contents of this beaker were at 80° C.–90° C. stirred for 10 minutes by the rotating cylinder. After cooling down, hard and brittle pellets were obtained.

EXAMPLE II

In a manner similar to that in Example I, a 25% aqueous suspension of coal fines was brought together with a mixture of 58% of a thermally cracked cycle oil from a catalytic-cracking plant and 42% of asphaltenes in the ratio of 0.21 kg. bituminous oil to 1 kg. coal fines. Hard and tough pellets were obtained. The pellets were subsequently heated to 150–200° C. for 5 minutes. After cooling down, the pellets were very hard and brittle.

EXAMPLE III

A horizontally mounted contacting apparatus of 5 cm. diameter, equipped with a rotating cylinder of 70 cm. length and 3 cm. diameter as rotor, and provided at the inlet with four vanes on the rotor with a diameter of 0.9 cm. in the radial direction and of 0.6 cm. in the axial direction, was used at a rotor speed of 2600 revolutions per minute at 95° C. Coal fines were introduced at 95° C. and a 20% aqueous suspension at a rate of 1200 grams coal fines per hour. A bituminous material with a penetration index of −2 and a softening point (ring and ball) of 55° C. was supplied at a rate of 195 grams per hour. The coal fines contained 59.9% coal, 36.7% ash and 3.4% water.

A stream of pellets of 1025 grams per hour was obtained, the pellets having the following properties.

| Pellets formed | Composition, percent | | |
| --- | --- | --- | --- |
| | Hydrocarbons | Water | Ash |
| 26 g./h. 2.0–3.4 mm | 10.2 | | |
| 85 g./h. 3.4–4.8 mm | 18.6 | | |
| 914 g./h. 5–8 mm | 20.8 | 4.4 | 5.7 |

Both the coal and the bituminous material are almost completely separated from the water.

A pellet of 5 mm. diameter, prepared in the manner described hereinabove, broke at a load of 12 kg. that was applied gradually in 5 seconds. An equally large pellet, prepared with a heavy fuel under otherwise identical conditions broke at a load of 0.2 kg.

I claim as my invention:

1. A process for making agglomerates of fine solids suspended in water which comprises imparting a turbulent motion to the aqueous suspension in the presence of a bituminous material having a penetration index no higher than zero and a softening point no higher than the temperature employed during the agglomeration.

2. The process according to claim 1, characterized in that the bituminous material has a penetration index below about −2.

3. The process according to claim 1, characterized in that said temperature employed during the agglomeration is at least 40° C. and below about 95° C.

4. The process according to claim 3, wherein the amount of bituminous material is at least 10%, based on the weight of the solids to be agglomerated.

5. The process according to claim 1, where in the agglomerates are subjected to a thermal after-treatment at a temperature between about 80° C. and 300° C. for at least 2 minutes.

6. The process according to claim 1 wherein the agglomeration is carried out at a temperature of at least 40° C. and below about 95° C. with at least 10%, based on the weight of the solids, bituminous material having a penetration index below about −2.

7. The process according to claim 3 wherein the bituminous material is a mixture of oil and asphaltenes.

8. The process according to claim 3 wherein the bituminous material is a mixture of oil and asphaltenes, said oil and said asphaltenes being introduced separately into said aqueous suspension.

References Cited

UNITED STATES PATENTS 2,903,423    9/1959    Mondria _____ 23—314
3,276,995    10/1966    McDonald _____ 264—117

ROBERT F. WHITE, *Primary Examiner.*

J. R. HALL, *Assistant Examiner.*